(12) United States Patent
Ohmiya

(10) Patent No.: US 7,880,941 B2
(45) Date of Patent: Feb. 1, 2011

(54) IMAGE FORMING DEVICE, AND CALIBRATION METHOD AND COMPUTER READABLE MEDIUM THEREFOR

(75) Inventor: Takashi Ohmiya, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 528 days.

(21) Appl. No.: 12/033,518

(22) Filed: Feb. 19, 2008

(65) Prior Publication Data
US 2008/0231875 A1 Sep. 25, 2008

(30) Foreign Application Priority Data
Mar. 19, 2007 (JP) .............................. 2007-070798

(51) Int. Cl.
*H04N 1/46* (2006.01)
(52) U.S. Cl. .................... 358/504; 358/406; 358/1.9; 399/43; 399/82
(58) Field of Classification Search ................ 358/1.9, 358/1.15, 406, 504, 518; 399/8, 9, 43, 49, 399/82; 347/5
See application file for complete search history.

(56) References Cited

U.S. PATENT DOCUMENTS

| | | | | |
|---|---|---|---|---|
| 5,933,676 | A * | 8/1999 | Ohno | 358/504 |
| 5,950,036 | A | 9/1999 | Konishi | |
| 7,092,119 | B1 * | 8/2006 | Hinds et al. | 358/504 |
| 7,421,221 | B2 * | 9/2008 | Suzuki | 399/49 |
| 7,469,991 | B2 | 12/2008 | Suzuki et al. | |
| 7,791,751 | B2 * | 9/2010 | Lofthus et al. | 358/504 |
| 2003/0094108 | A1 * | 5/2003 | Shiki | 101/171 |
| 2005/0207768 | A1 * | 9/2005 | Suzuki | 399/49 |
| 2007/0165255 | A1 * | 7/2007 | Takeuchi | 358/504 |
| 2007/0189789 | A1 * | 8/2007 | Suzuki | 399/49 |
| 2009/0161185 | A1 * | 6/2009 | Hashizume | 358/518 |
| 2009/0244661 | A1 * | 10/2009 | Hashizume | 358/505 |
| 2010/0110460 | A1 * | 5/2010 | Miyata | 358/1.9 |

FOREIGN PATENT DOCUMENTS

JP 09-027879 1/1997

(Continued)

OTHER PUBLICATIONS

Notification of Reasons of Rejection for JP Application No. 2007-070798 mailed Feb. 5, 2009.

*Primary Examiner*—Kimberly A Williams
(74) *Attorney, Agent, or Firm*—Banner & Witcoff, Ltd.

(57) ABSTRACT

An image forming device, which is capable of double-side printing to form an image on each of first and second sides of a recording medium, includes a calibration unit configured to perform calibration for modifying quality of the image to be formed, a first judging unit configured to judge, for each page to be printed, whether the calibration is to be performed, a second judging unit configured to judge whether a page to be printed is one of a first side in one-side printing and a first side in the double-side printing, and a control unit configured to control the calibration unit to perform the calibration when the first judging unit judges that the calibration is to be performed, and the second judging unit judges that the page to be printed is one of the first side in the one-side printing and the first side in the double-side printing.

13 Claims, 6 Drawing Sheets

FOREIGN PATENT DOCUMENTS

| | | |
|---|---|---|
| JP | 10-114128 | 5/1998 |
| JP | 2001-312117 | 11/2001 |
| JP | 2003-091224 | 3/2003 |
| JP | 2004-252573 | 9/2004 |
| JP | 2006-139089 | 6/2006 |
| JP | 2006-292824 | 10/2006 |
| JP | 2008-102201 | 5/2008 |

* cited by examiner

IMAGE FORMING DEVICE, AND CALIBRATION METHOD AND COMPUTER READABLE MEDIUM THEREFOR

CROSS-REFERENCE TO RELATED APPLICATION

This application claims priority under 35 U.S.C. §119 from Japanese Patent Application No. 2007-070798 filed on Mar. 19, 2007. The entire subject matter of the application is incorporated herein by reference.

BACKGROUND

1. Technical Field

The following description relates to one or more image forming devices, and calibration methods and computer readable media therefor.

2. Related Art

Conventionally, there has been known an image forming device configured to achieve a higher image quality than a predetermined level by calibrating an image density change and/or color (positional) deviations among a plurality of colors over-printed. There can be considered as an execution timing when this kind of calibration is to be carried out, a moment between pages to be printed and a moment between print jobs to be executed as well as a moment when a power is applied to the device.

However, in a setting for performing the calibration at the moment between print jobs, even though the calibration is needed while a print job is being executed, the calibration cannot be applied while the print job is being executed. Hence, the printing operation is continued with a low-quality image being drawn until the job is completed. For example, in the case of executing a print job of 100 pages to be printed, even though the calibration is needed at a time when the 50th page is printed after starting the printing operation, the calibration cannot be applied to the remaining 50 pages in the print job.

In this regard, in the setting for performing the calibration at the moment between pages to be printed, in the above example, the calibration is carried out at a timing between the 50th page and 51st page. Hence, a higher image quality can be attained on the 51st page and pages following the 51st page.

Meanwhile, Japanese Patent Provisional Publication No. 2004-252573 discloses a technique for performing a density correction as an example of the calibration. This technique is configured such that the calibration is carried out at the moment between pages to be printed.

SUMMARY

In the above setting for performing the calibration at the moment between pages to be printed, the calibration can be carried out in a timely fashion. However, when the aforementioned setting for performing the calibration at the moment between pages to be printed setting is active in the case where double-side printing is required, an image quality on a first side of a printing paper may be different from that on a second side of the printing paper. In general, in the case of the double-side printing, image qualities on both sides of the printing paper are desired to be equivalent to one another. Accordingly, the above situation where the image qualities on both sides are different has been considered as a problem to be solved so far.

Aspects of the present invention are advantageous in that there can be provided one or more improved image forming device, and calibration methods and computer readable media therefor that make it possible to perform double-side printing with equivalent image qualities achieved on both sides on a printing paper even though a calibration function is configured to be available in a timely fashion.

According to aspects of the present invention, there is provided an image forming device capable of double-side printing to form an image on each of first and second sides of a recording medium, which includes a calibration unit configured to perform calibration for modifying quality of the image to be formed, a first judging unit configured to judge, for each page to be printed, whether the calibration is to be performed, a second judging unit configured to judge whether a page to be printed is one of a first side in one-side printing and a first side in the double-side printing, and a control unit configured to control the calibration unit to perform the calibration when the first judging unit judges that the calibration is to be performed, and the second judging unit judges that the page to be printed is one of the first side in the one-side printing and the first side in the double-side printing.

According to another aspect of the present invention, there is provided a calibrating method used for an image forming device configured to perform double-side printing for forming an image on each of first and second sides of a recording medium and to perform calibration for modifying quality of the image to be formed, the method including a first step of judging whether the calibration is to be performed for each page to be printed, a second step of judging whether a page to be printed is one of a first side in one-side printing and a first side in the double-side printing, and a third step of performing the calibration when it is judged in the first judging step that the calibration is to be performed, and it is judged in the second judging step that the page to be printed is one of the first side in the one-side printing and the first side in the double-side printing.

According to a further aspect of the present invention, there is provided a computer readable medium comprising computer readable instructions stored thereon, which cause a computer, which is configured to perform double-side printing for forming an image on each of first and second sides of a recording medium and to perform calibration for modifying quality of the image to be formed, to perform a first step of judging whether the calibration is to be performed for each page to be printed, a second step of judging whether a page to be printed is one of a first side in one-side printing and a first side in the double-side printing, and a third step of performing the calibration when it is judged in the first judging step that the calibration is to be performed, and it is judged in the second judging step that the page to be printed is one of the first side in the one-side printing and the first side in the double-side printing.

In the above configurations according to some aspects of the invention, the calibration may be performed before printing a first side of a subject page to be printed, yet never performed before printing the second side of the subject page. Hence, the first and second sides of the page in the double-side printing are always printed with the same print settings. Thereby, it is possible to perform double-side printing with equivalent image qualities on both sides on the page, providing a function of the calibration available in a timely fashion.

BRIEF DESCRIPTION OF THE ACCOMPANYING DRAWINGS

FIG. 1 schematically shows a cross-sectional side view of a laser printer as an image forming device in a first embodiment according to one or more aspects of the present invention.

Figure 4:
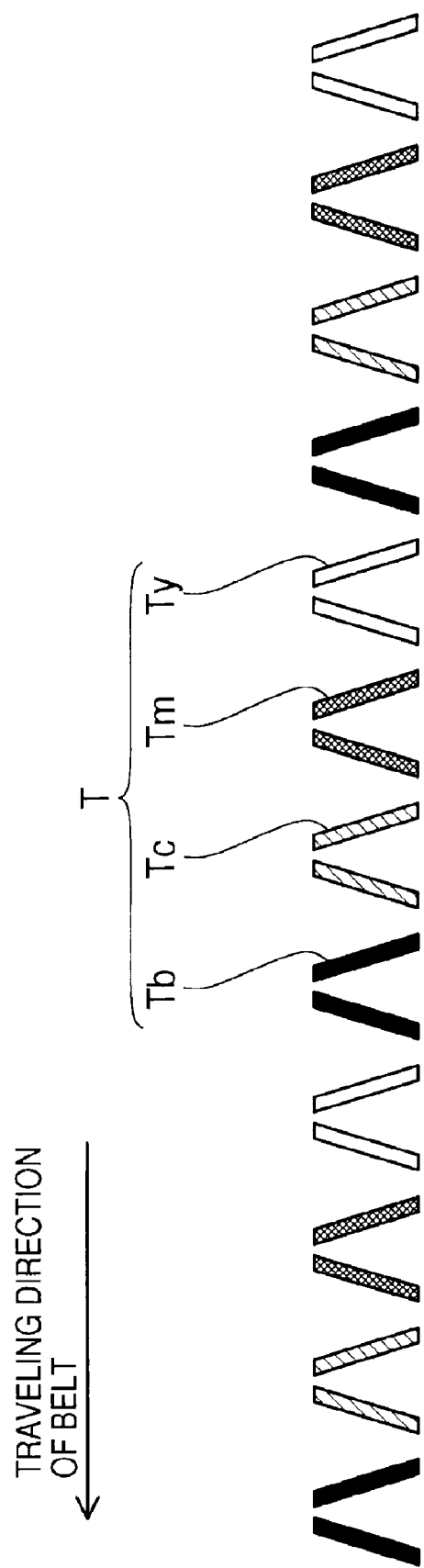

FIG. 4 schematically shows test patterns printed in a carrying belt in the first embodiment according to one or more aspects of the present invention.

Figure 5:
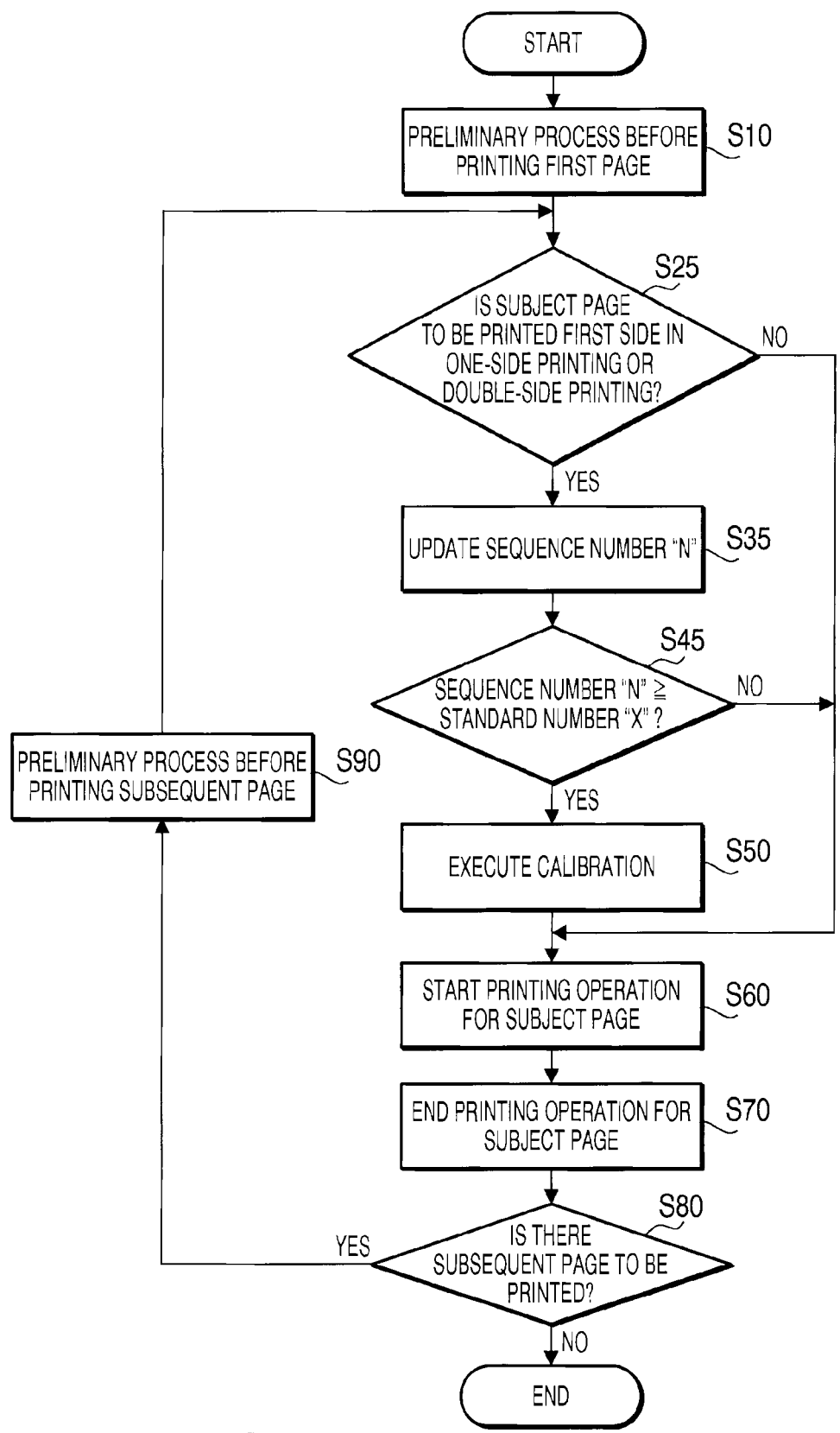

FIG. 5 is a flowchart showing a procedure of a printing operation in a second embodiment according to one or more aspects of the present invention.

Figure 6:
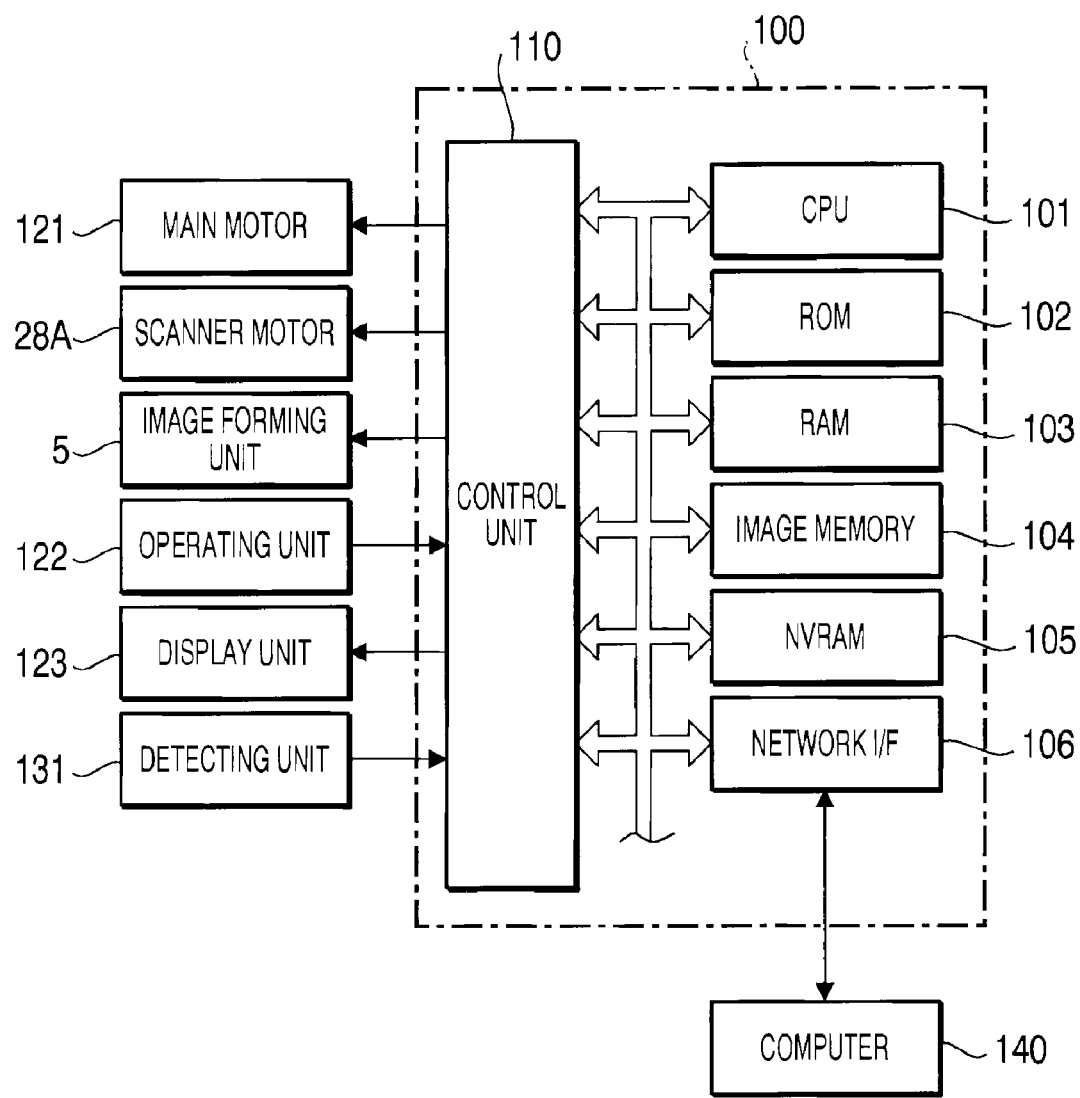

FIG. 6 is a block diagram schematically showing of an electrical configuration of a laser printer in another embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the invention will be described with reference to the accompanying drawings.

First Embodiment

A first embodiment according to aspects of the invention will be explained with reference to FIGS. 1 to 4.

Figure 1:
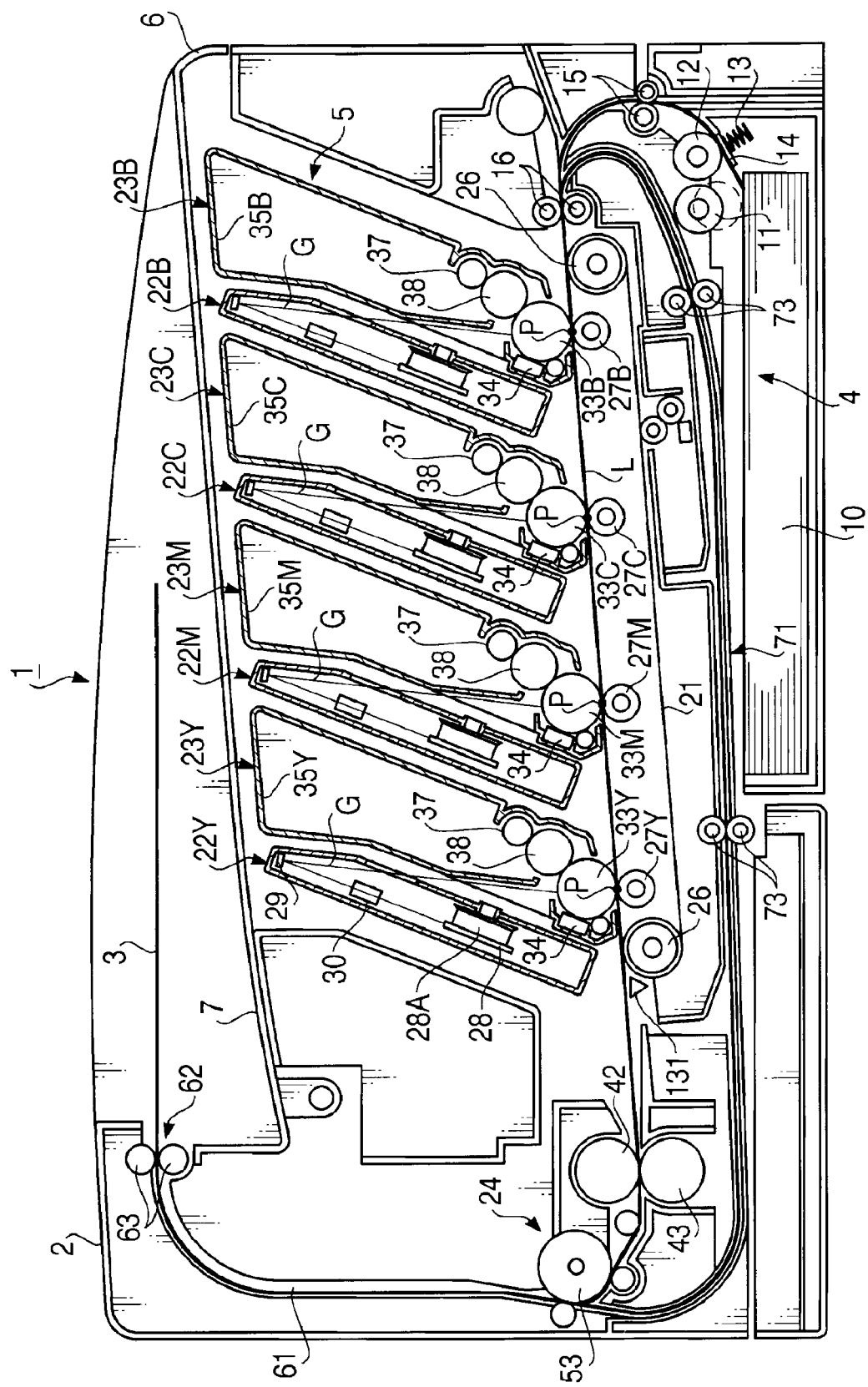

1. Mechanical Configuration of Laser Printer (1) Overall Configuration of Laser Printer FIG. 1 schematically shows a cross-sectional side view of a laser printer 1 as an image forming device according to aspects of the invention. The laser printer 1 is a direct tandem color laser printer provided with four photoconductive drums 33B, 33C, 33M, and 33Y that correspond to Black (K), Cyan (C), Magenta (M), and Yellow (Y), respectively. It is noted that, in the following description, a back-and-front direction will be expressed with a right side in FIG. 1 as a front side.

As shown in FIG. 1, the laser printer 1 is provided with a box-shaped main body casing 2. In addition, there are provided in the main body casing 2, a sheet feeder 4 for feeding a paper 3 as recording medium, and an image forming unit 5 for forming an image on the paper 3 fed. On an upper face of the main body casing 2, an openable and closable upper face cover 6 is provided. By opening the upper face cover 6, it is possible to change process cartridges 23B, 23C, 23M, and 23Y in the main body casing 2. Further, on the upper face cover 6, a catch tray 7 is formed as a place to which the paper 3 printed is to be ejected.

(2) Configuration of Sheet Feeder

The sheet feeder 4 includes, on a bottom inside the main body casing 2, a detachable paper feed tray 10, a pick-up roller 11 and paper feed roller 12 both of which are arranged along the back-and-front direction at an upper front end of the paper feed tray 10. In addition, the sheet feeder 4 includes, on a bottom inside the main body casing 2, a separation pad 14 that establishes pressure contact with the paper feed roller 12 by a biasing force of a spring 13, a pair of carrying rollers 15 provided at an upper front side of the paper feed roller 12, and a pair of registration rollers 16 provided at an upper rear side of the carrying rollers 15.

At a bottom face of the paper feed tray 10, there is provided a paper pressing plate (not shown) configured to tilt so as to lift a front side of the paper 3. The paper 3 in the paper feed tray 10 is pressed toward the pick-up roller 11 by a biasing force of the paper pressing plate, and carried toward between the paper feed roller 12 and separation pad 14 by a rotation of the pick-up roller 11. Then, the paper 3 is conveyed diagonally in an upper front direction with each paper 3 being sandwiched between the paper feed roller 12 and separation pad 14 by the rotation of the paper feed roller 12. Thereafter, the single paper is carried to the registration roller 16 after paper powder thereon is removed by the pair of carrying rollers 15.

(3) Carrying Belt

A carrying belt 21 is tensioned in a state slightly tilted to a rear end, and revolved with a rear belt supporting roller 26 being rotated by a driving motor (not shown). Four transfer rollers 27B, 27C, 27M, and 27Y are aligned in the back-and-front direction at intervals of a predetermined distance within the carrying belt 21.

The four transfer rollers 27B, 27C, 27M, and 27Y are arranged to face the respective below-mentioned photoconductive drums 33B, 33C, 33M, and 33Y, and the carrying belt 21 is sandwiched between the transfer rollers 27B, 27C, 27M, and 27Y and photoconductive drums 33B, 33C, 33M, and 33Y.

(4) Configurations of Image Forming Units and Scanner Units

The image forming unit 5 is provided with the four photoconductive drums 33B, 33C, 33M, and 33Y that correspond to colors of Black (B), Cyan (C), Magenta (M), and Yellow (Y), respectively. The photoconductive drums 33B, 33C, 33M, and 33Y are linearly aligned in a longitudinal direction of the carrying belt 21 at intervals of a predetermined distance.

In upper right positions of the respective photoconductive drums 33B, 33C, 33M, and 33Y, there are provided developing units 35B, 35C, 35M, and 35Y. Meanwhile, in upper left positions of the respective photoconductive drums 33B, 33C, 33M, and 33Y, there are charging devices 34. Further, behind the respective developing units 35B, 35C, 35M, and 35Y, scanner units 22B, 22C, 22M, and 22Y are located.

It is noted that the photoconductive drums 33B, 33C, 33M, and 33Y have the same basic configuration, and the developing units 35B, 35C, 35M, and 35Y have the same basic configuration. Furthermore, the charging devices 34 have the same basic configuration, and the scanner units 22B, 22C, 22M, and 22Y have the same basic configuration. Therefore, in the following descriptions, there will be given explanations of the elements located at a left end in FIG. 1 (i.e., the elements associated with Yellow that include the photoconductive drum 33Y, developing unit 35Y, charging device 34, and scanner unit 22Y), and explanations of the other elements will be omitted.

The developing unit 35Y is provided with a developing roller 38, supply roller 37, and layer thickness regulating blade (not shown) at a lower portion of a casing that houses toner. The developing roller 38 and the supply roller 37 are arranged to face one another. When the toner passes through between both the rollers 37 and 38, the toner is supplied from the supply roller 37 to the developing roller 38. Further, both the drums 37 and 38 have a function of charging the toner positively with friction caused by rotations thereof. In addition, the layer thickness regulating blade is configured to maintain a thickness of the toner held on the developing roller 38 in a state positively charged constant. It is noted that the developing roller 38 is arranged to also face the photoconductive drum 33Y.

The charging device 34 is a so-called scorotron charging device, which incorporates a charging wire in a shield case thereof. The charging wire is configured such that a high voltage is applied thereto to cause a corona discharge. By applying a predetermined constant voltage is applied to a grid when the corona discharge is caused, a surface of the photoconductive drum 33Y is charged positively and evenly.

The scanner unit 22Y is provided with a laser source (not shown), polygon mirror 28, fθ lens 30, and reflecting mirror 29. The polygon mirror 28 is rotated by driving a scanner motor 28A, and makes a laser beam emitted by the laser source incident onto the photoconductive drum 33Y through a route G indicated by a solid line in FIG. 1, so that the photoconductive drum 33Y can be exposed.

(5) Configuration of Fixing Unit

In addition, a fixing unit 24 is provided behind the carrying belt 21. The fixing unit 24 is provided with a heating roller 42 and a pressing roller 43 located to face the heating roller. The heating roller 42 includes a halogen lamp (not shown) for heating, and is configured to thermally fix color images formed with toners (developers) transferred onto the paper by the transfer rollers 27B, 27C, 27M, and 27Y while the paper is passing through between the heating roller 42 and the pressing roller 43.

(6) Paper Carrying Route after Toner Fixing and One-side Printing

A fixed paper ejecting roller 53 and an arched route 61 are provided at a rear portion in the main body casing 2. The fixed paper feed roller 53 is configured to guide the paper 3 with the toner fixed thereon to the arched route 61. In addition, at an upper end of the arched route 61, there is provided a discharge portion 62 having upper paper ejecting rollers 63.

A normal printing operation (one-side printing in which a printing operation is performed only on one side of the paper 3) can be performed by sequentially implementing a below-mentioned image forming process, thermal fixing process, and paper ejection process.

In an image forming process, firstly, the surfaces of the photoconductive drums 33B, 33C, 33M, and 33Y are positively and evenly charged by the charging devices 34. Thereafter, a control based on image data is begun, and the laser beams are directed from the scanner units 22B, 22C, 22M, and 22Y toward the photoconductive drums 33B, 33C, 33M, and 33Y, respectively.

Thereby, predetermined electrostatic latent images based on the image data are formed on the respective surfaces of the photoconductive drums 33B, 33C, 33M, and 33Y. In other words, areas illuminated by the laser beams on the positively and evenly charged surfaces of the photoconductive drums 33B, 33C, 33M, and 33Y have lower electric potentials than the other areas on the surfaces.

Subsequently, by rotations of the developing rollers, the positively-charged toners held on the developing rollers are supplied to the electrostatic latent images formed on the respective photoconductive drums 33B, 33C, 33M, and 33Y. Thereby, the electrostatic latent images on the photoconductive drums 33B, 33C, 33M, and 33Y are made to be visible images, and toner images (developer images) formed due to reversal phenomena are held on the surfaces of the photoconductive drums 33B, 33C, 33M, and 33Y.

In addition, concurrently with the above process, a process of carrying the paper 3 is performed, conveying papers one by one from the paper feed tray 10 toward a paper carrying route L. The paper 3 conveyed to the paper carrying route L is carried to transfer positions P (points where each photoconductive drum contacts each transfer roller) by the carrying belt 21.

When the paper 3 passes through the transfer position P, the toner image (developer image) of each color that is held on the surface of the each of the photoconductive drums 33B, 33C, 33M, and 33Y is sequentially over-transferred onto the paper 3 by a transfer bias applied to each of the transfer rollers 27B, 27C, 27M, and 27Y. Thus, a color toner image (developer image) is formed on the paper 3.

After the image forming process is completed, a toner fixing process is performed. In the toner fixing process, the paper 3 with the color toner image developer image) formed thereon is conveyed to the fixing unit 24, and the toner image is thermally fixed while the paper 3 passes through between the heating roller 42 and the pressing roller 43.

Then, the paper 3 after the thermal fixing operation is directed toward an upper portion of the device via the arched route 61, and ejected onto the catch tray 7 by the upper ejecting rollers 63 (one-side printing).

Re-carrying Route and Double-side Printing

In addition, at a lower portion in the main body casing 2, a re-carrying route 71 is provided between the carrying belt 21 and the paper feed tray 10. The re-carrying route 71 is shaped to extend in the back-and-front direction of the main body casing 2. Further, relay rollers 73 are located in two positions on the way of the re-carrying route 71. The re-carrying route 71 has a rear end serially linked with the arched route 61, and a front end that is bent upward at a front portion in the main body casing 2 and joins the paper carrying route L in front of the registration rollers 16.

By the above configuration, as well as the aforementioned one-side printing, double-side printing for forming images on the both sides of the paper 3 can be attained. Specifically, when performing the double-side printing, firstly, an image is formed on a first side of the paper 3 in accordance with the same procedure as the one-side printing. Then, after forming the image, the formed image is thermally fixed by the fixing unit 24, and the paper 3 is once conveyed to the arched route 61.

Thereafter, the paper 3 is carried toward a front of the device via the re-carrying route 71, and returned to the paper carrying route L with a second side thereof facing upward. Accordingly, by repeating the same procedure as the image forming on the first side, an image can be formed on the second side. After forming the image on the second side, the formed image is thermally fixed, and the paper 3 is carried toward an upper portion of the device without passing through the re-carrying route 71, ejecting the paper 3 with the images printed on the both sides thereof onto the catch tray 7.

It is noted that, in the present embodiment, in the case of performing the double-side printing, an image to be printed on a back side of the paper is formed on the first side, while an image to be printed on a top side is formed on the second side. Thus, it is possible to eject the paper with the top side of the paper facing upward after the double-side printing.

2. Electrical Configuration

Figure 2:
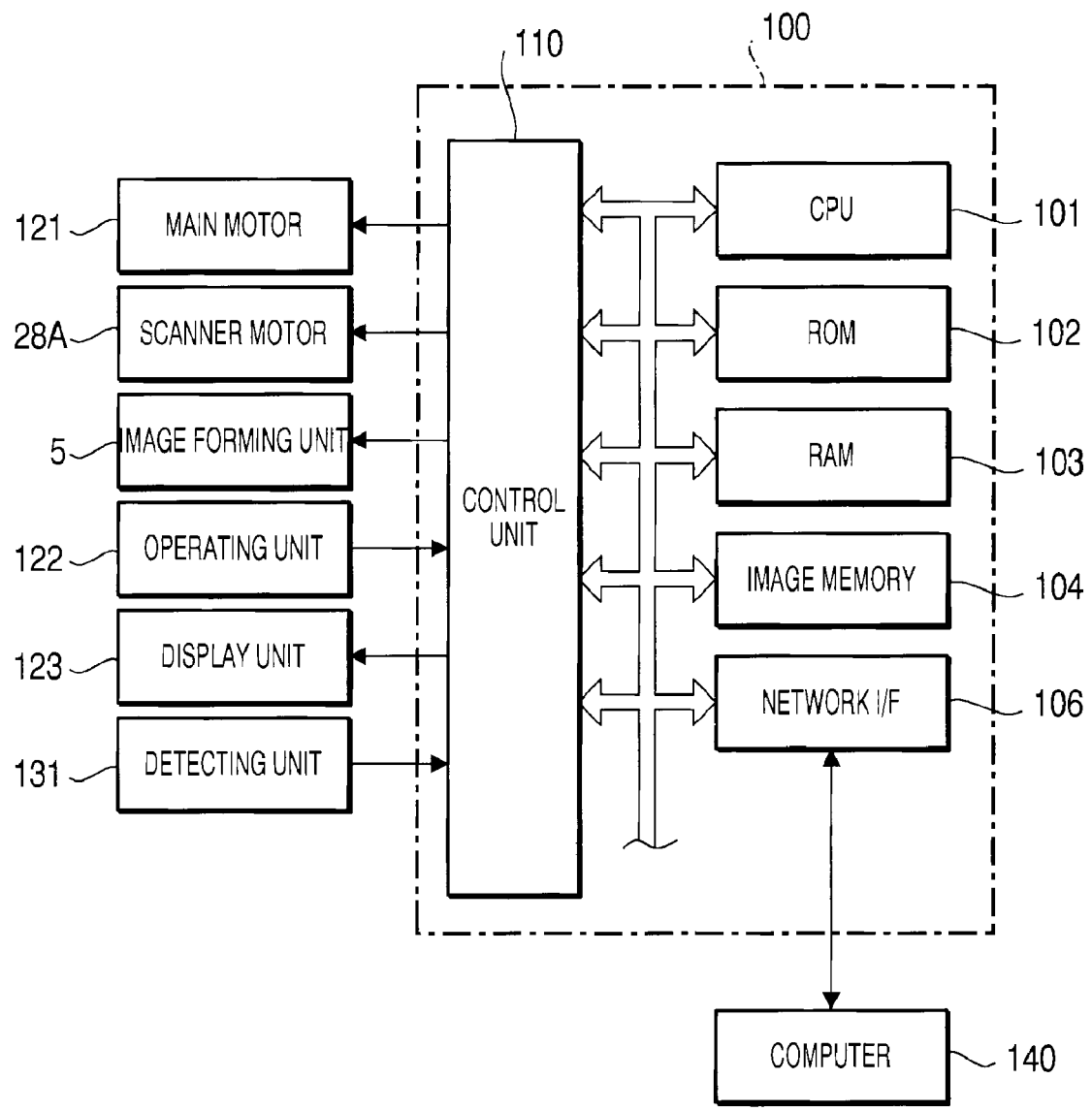
FIG. 2 is a block diagram schematically showing of an electrical configuration of the laser printer in the first embodiment according to one or more aspects of the present invention.

Subsequently, an electrical configuration of the laser printer 1 will be described. FIG. 2 is a block diagram schematically showing of an electrical configuration of the laser printer 1. A control unit 100 includes a CPU 101, ROM 102, RAM 103, image memory 104, interface 106, and control portion 110.

The ROM 102 is configured to store therein various control programs for controlling the laser printer 1. The RAM 103 is employed as a work area into which the various control programs are read out. In addition, the image memory 104 is configured to temporarily store therein image data that are received from a higher-level device (in this case, the computer 140) via the interface 106 and developed.

The control portion 110 is configured with an ASIC (Application Specific Integrated Circuit), and electrically connected with the aforementioned image forming unit 5, a main motor 121 configured to drive the carrying belt 21, the scanner motor 28A, an operating unit 122 that includes an input panel, a display unit 123 that includes various lamps, and a detecting unit 131. It is noted that the detecting unit 131 is located behind the carrying belt 21, and configured, for example, with an optical sensor, so as to read positions of test patterns to be formed on the carrying belt 21. It is noted that the test patterns are patterns formed on the carrying belt 21 as shown in FIG. 4 to measure positional deviations of the toner image of the respective colors when a below-mentioned calibration process in S50 is performed.

3. Printing Operation

Hereinafter, there will be explained a detailed procedure until a printing operation is completed after the power is applied to the device. When the laser printer 1 is powered ON by an operator, firstly, an initialization process (process for initializing the RAM 103, image memory 104, and the like) is executed by the CPU 101. Then, the laser printer 1 is set into a standby state of keeping waiting for printing data to be transmitted by the computer 140 as a higher-level device.

After the printing data are sent by the computer 140, and received by the laser printer 1, the laser printer 1 develops main data of the printing data (PDL data) into image data (raster data). Then, the created image data are temporarily stored in the image memory 104.

It is noted that the printing data includes a header containing a print request command as well as the aforementioned main data of the printing data.

Figure 3:
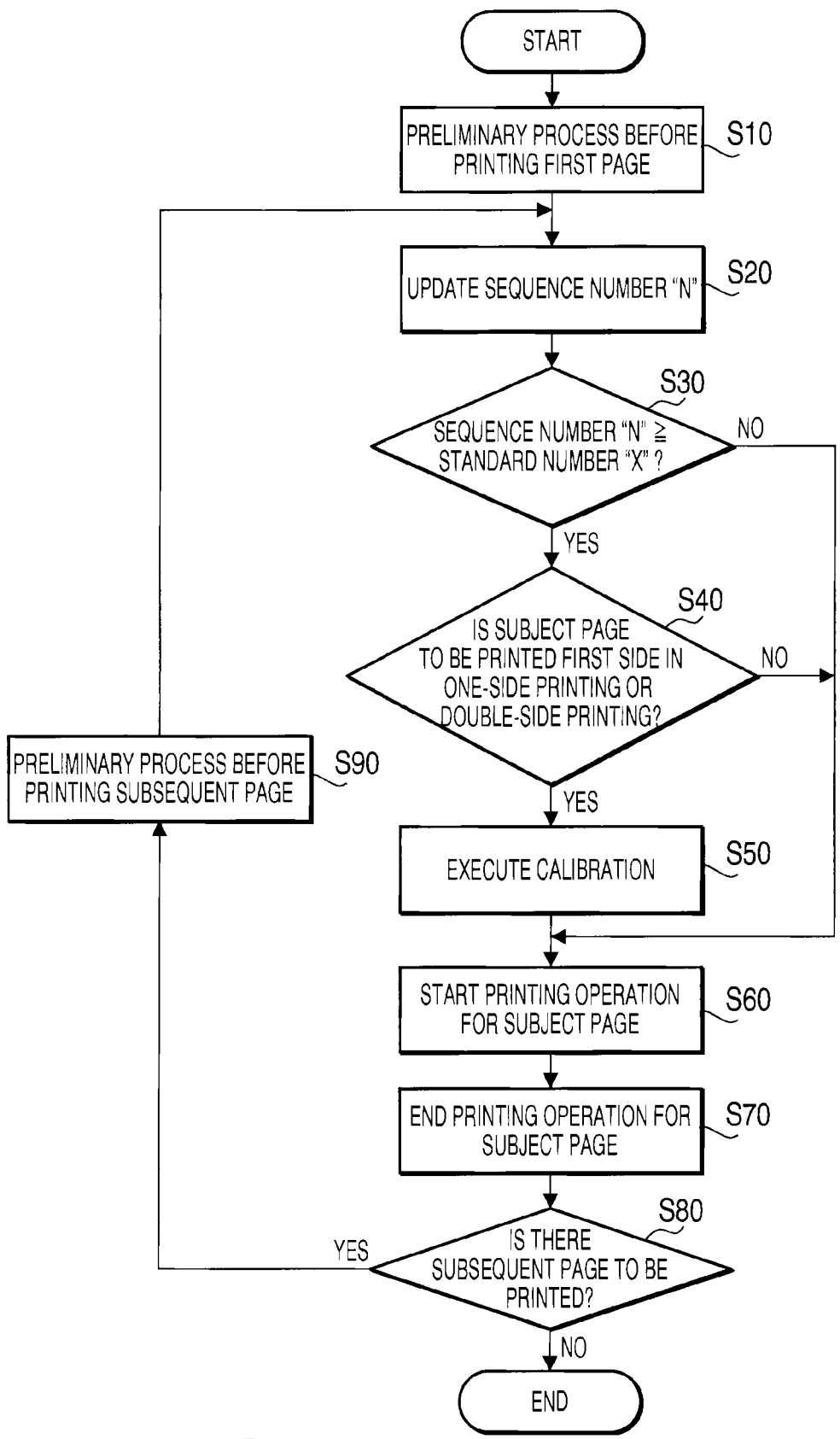
FIG. 3 is a flowchart showing a procedure of a printing operation in the first embodiment according to one or more aspects of the present invention.

Concurrently with the above process of storing the image data into the image memory 104, the CPU 101 controls each element and proceeds with the printing operation on a print job basis in accordance with a flowchart shown in FIG. 3.

When the printing operation is started, firstly, a sequence number N (as described in detail later, the number of pages sequentially printed) is set to be "0," and thereafter the present process goes to S10. In S10, a preliminary process before printing a first page is performed by the CPU 101, for example, so as to check the number of colors for printing the first page (e.g., which is to be performed between monochrome printing and color printing).

When the preparation for beginning the printing of the subject page (in this case, the first page) is completed, it is judged by the CPU 101 whether to subsequently implement the calibration (below-mentioned S20, S30).

Here, the calibration represents a correcting operation for keeping quality of a formed image constant. There are various factors to vary the quality of the formed image. Among them, for instance, there has been known as a factor, a temperature change inside the device, generated due to a long continuous printing operation, which is may cause positional deviations of the over-transferred toner images (namely, color deviations).

In view of the above factor, in the present embodiment, the sequence number N is counted in S20 as an example of a parameter representing how long a printing operation is continued. In this stage, since a page to be printed is the first page, the sequence number N is counted as "1" by the CPU 101.

In S30, a process of judging whether the sequence number N reaches a "standard number X" is performed by the CPU 101. In the present embodiment, a value of the "standard number X" is determined to be "100 pages." Therefore, when the sequence number N is less than the "standard number X," the above judgment in S30 is negative (S30: No). Meanwhile, when the sequence number N is equal to or more than the "standard number X," the above judgment in S30 is affirmative (S30: Yes).

In this stage, the sequence number N is "1" and does not reach "100." Hence, the judgment in S30 is negative (S30: No), and the present process goes to S60.

In S60, the printing operation is started for the page to be printed, namely, the first page. When the printing operation is started, image data for the page to be printed are read out, and then each element such as the main motor 121, scanner motor 28A, and image forming unit 5 is driven in accordance with a command issued by the CPU 101.

Thereby, the paper 3 is discharged from the paper feed tray 10, and thereafter, via the image forming process, an image is formed on the paper 3 based on the image data. The paper 3 with the image formed thereon is then ejected onto the catch tray 7 via the thermal fixing process. Thereby, the printing operation for the first page is completed (S70).

When a process in S70 is completed, the present process goes to S80, in which it is judged by the CPU 101 whether there is a next page.

When the print job is a job for a single page, the above judgment is negative (S80: No), the printing process is terminated. Meanwhile, when the print job is a job for a plurality of pages, the above judgment is affirmative (S80: Yes), the printing operation is continued.

Hereinafter, the following explanation will be given supposing that the print job is a job for a plurality of pages. When the judgment in S80 is affirmative (S80: Yes), the present process goes to S90, in which a preliminary process before printing a subsequent page is performed. The process in S90 is the same as that in S10. Namely, in S90, for example, there is performed a process of checking the number of colors for printing the next page (e.g., which is to be performed between monochrome printing and color printing).

When the process in S90 is completed, the present process goes to S20, there is executed by the CPU 101, a process of updating the sequence number N. Here, since the page to be printed is a second page, the sequence number N is updated into "2." Thereafter, in S30, it is judged by the CPU 101 whether to perform the calibration based on the value of the sequence number N updated in S20.

In this stage, the sequence number N is "2" and does not reach "100." Therefore, the judgment in S30 is negative (S30: No), the present process goes to S60. The following processes are the same as the aforementioned processes in the case of the first page. Namely, an image for the second page is formed on a paper 3 through S60 and S70.

Thereafter, when the judgment in S80 is affirmative (S80: Yes), the present process goes to S90, in which a preliminary process before printing a subsequent page is performed. When the process in S90 is completed, the present process again goes to S20, in which the process of updating the sequence number N is performed.

Thus, in the present embodiment, while there is a subsequent page to be printed, the steps of S20 to S90 are repeatedly carried out. In addition, each time the printing operation is performed for a new page, the sequence number N is updated in S20.

After the steps of S20 to S90 are repeatedly carried out 99 times, the next printing operation is an operation for 100th page since the first page. In this case, the sequence number N is updated into "100" in S20. Accordingly, the judgment in S30 by the CPU 101 is affirmative (S30: Yes, namely, it is judged that the timing when the calibration is to be performed has come), and the present process goes to S40.

It is noted that, in the present embodiment, it is judged based on the sequence number N whether to perform the calibration (whether the timing when the calibration is to be performed has come). However, the sequence number N is just an example of a parameter representing a state of the printer in use. The above judgment may be made based on another parameter (for example, a temperature change of the main body casing 2 included in the laser printer 1).

In the meantime, it is judged in S40 by the CPU 101 whether the calibration is permitted for the 100th page to be printed in the following manner. Specifically, when the subject page is a page to be printed in the one-side printing or the first side of the paper 3 in the double-side printing, the judgment in S40 is affirmative (S40: Yes). In this case, the present process goes to S50, in which the calibration is carried out. On the contrary, when the subject page to be printed is the second side of the paper 3 in the double-side printing, the judgment in S40 is negative (S40: No). In this case, the present process goes to S60, in which the printing operation is started.

The following explanation will be given in separate cases of a case where the 100th page is a page to be printed in the one-side printing and a case where the 100th page is the second side in the double-side printing.

(a) Case where the 100th page is a page in the one-side printing In the case where the 100th page is a page to be printed in the one-side printing, a below-mentioned calibration process is executed in accordance with a command by the CPU 101 (S50).

When the calibration process is performed, firstly, in order to measure positional deviations of the over-transferred toner images (namely, color deviations), there is performed a process of directly printing test patterns T (more specifically, respective test patterns Tb, Tc, Tm, and Ty of the four colors Black (B), Cyan (C), Magenta (M), and Yellow (Y)) on the surface of the carrying belt 21. After the test patterns T are printed, printed positions of the test patterns T are read out by the detecting unit 131 shown in FIG. 1.

Then, read-out data regarding the printed positions are transmitted to the CPU 101. The CPU 101 compares the read-out printed positions with theoretical values to calculate deviations of the printed positions with respect to the respective colors.

Thus, after the printed position deviations with respect to the respective colors are detected, the CPU 101 determines correction values to correct the printed position deviations with respect to the respective colors. Thereafter, setting changes are made (namely, the calibration is performed). With the setting changes, settings such as respective exposure timings of the scanner units 22B, 22C, 22M, and 22Y (in other words, respective exposure positions with respect to the photoconductive drums 33B, 33C, 33M, and 33Y) are adjusted to reduce the positional deviations.

When the calibration process in S50 is completed, the steps of S60 and S70 are executed. In the steps of S60 and S70, the printing operation is performed in accordance with the exposure timings after the calibration process based on a command issued by the CPU 101. Thereby, the color deviations of the respective colors are more reduced than those in the case where the exposure timings are not adjusted, and the 100th page is printed with a desirable image quality.

In addition, after the calibration is performed once, the same settings are maintained until the calibration is performed again. Therefore, it is possible to maintain desirable qualities of images on the 101st page and pages following the 101st page in the same manner as the 100th page.

It is noted that there can be considered various ways of setting a subsequent timing when the calibration is to be performed. For example, there can be considered as the subsequent timing, a moment when the number of sequentially-printed pages reaches "100" after the calibration.

(b) Case where the 100th page is the second side in the double-side printing In the case where the 100th page is the second side in the double-side printing, the judgment in S40 by the CPU 101 is negative (S40: No). Consequently, the present process goes not to S50, but to S60. Namely, the printing operation is advanced without performing the calibration.

Thus, by prohibiting the calibration from being performed immediately before printing the second side in the double-side printing, the first side in the double-side printing (in this case, the 99th page) is always printed based on the same settings as the second side in the double-side printing (in this case, the 100th page). Therefore, the image qualities of both the first and second sides in the double-side printing can be kept equivalent.

In addition, generally, the carrying belt 21 (belt supporting roller 26) and the relay rollers 73 on the re-carrying route 71 are configured to be driven by the same driving motor. Therefore, so as to perform the calibration before printing the second side in the double-side printing, it is required that there is provided between the driving motor and the relay rollers 73, such a mechanism (e.g., clutch mechanism) that the rotations of the relay rollers 73 are stopped and the paper 3 is not conveyed toward the carrying belt 21 side while performing the calibration. However, in the present embodiment, it is unnecessary to provide such a specific mechanism, and the above object is achieved with a simple configuration.

Further, in the present embodiment, when the judgments in S30 and S40 are affirmative (S30: Yes and S40: Yes), the calibration is performed, and otherwise, the calibration is not performed. Namely, even though the judgment in S30 is affirmative (S30: Yes), in the case where the page to be printed is the second side in the double-side printing, the judgment in S40 is negative (S40: No). Consequently, it is prohibited that the calibration is performed prior to printing the second side in the double-side printing.

In addition, the prohibited calibration is performed immediately before printing the next page to be printed, namely, the 101st page. When the 100th page is the second side in the double-side printing, the 101st page is a page to be printed in the one-side printing or the first side in the double-side printing. In this case, the judgment in S40 is always affirmative (S40: Yes).

Consequently, the present process goes to S50, in which the calibration is performed immediately before printing the 101st page. Accordingly, all pages to be printed that follow the 101st page are printed in accordance with the settings after the calibration.

4. Effects

In the present embodiment, even though the print job is being executed, the calibration is performed in the case where predetermined conditions are satisfied. Therefore, the image quality can be adjusted in a timely fashion.

In addition, in the present embodiment, the steps of S30 and S40 are provided as the predetermined conditions for judging whether to perform the calibration. The calibration is performed when both the conditions are satisfied. Thereby, it is prohibited that the calibration is performed immediately before printing the second side in the double-side printing. Therefore, the first and second sides in the double-side printing are printed based on the same settings such as the exposure timing. Hence, the qualities of the first and second sides in the double-side printing can be kept equivalent.

In addition, in the present embodiment, it is judged based on the sequence number N (the number of sequentially-printed pages) whether the timing when the calibration is to be performed has come. Therefore, the number of printed pages is required to be counted in any manner. To meet this requirement, a specific counting means may be provided. In this regard, in the present embodiment, the number of printed pages can be counted by counting the number of repeated processes. Thereby, the above object can be achieved without providing the specific counting means.

It is noted that, in the first embodiment, the printing operation shown in FIG. 3 is performed on the print job basis. Therefore, counting the sequence number N is always implemented within the print job, and is never carried over to a subsequent print job. In other words, even though the sequence number N is "100" at a moment when the print job is completed, when the subsequent print job is started, the sequence number N is set to be "0."

Second Embodiment

Next, a second embodiment according to aspects of the invention will be described with reference to FIG. 5. In the second embodiment, a mechanical configuration and an electrical configuration are the same as those in the first embodiment, and a portion of the procedure of the printing operation in the first embodiment is modified.

Specifically, in the second embodiment, an order of the steps of S20, S30, and S40 to be performed in the first embodiment is changed such that the step S40 in the first embodiment (S25 in the second embodiment) is executed following the step S10. Thereafter, the steps of S20 and S30 in the first embodiment (S35 and S45 in the second embodiment, respectively) are sequentially performed.

Even in such a configuration, since the calibration is performed when both the conditions (S25 and S45 in the second embodiment) are satisfied, the same effects as the first embodiment can be brought.

(Modifications)

The present invention is not limited to the embodiments described with the aforementioned description and drawings. For example, the following embodiment is included in a technical scope of the invention, and various sorts of modifications other than the following embodiment may be possible as far as they are within a technical scope which does not extend beyond a subject matter of the invention.

(1) In the above embodiments, the calibration for correcting the color deviations is shown. However, the invention can be applied to a calibration for correcting density. The density correction is carried out, for example, based on a measurement result obtained by printing test patterns (density patches) on the carrying belt 21 and measuring the densities with a sensor.

(2) In the above embodiments, the direct transfer type color laser printer is shown. However, the present invention can be applied, for example, to an intermediate transfer type laser printer or an inkjet printer.

(3) In the first embodiment, it is judged in the step S30 whether the sequence number N is equal to or more than the standard number X. When it is judged that the sequence number N is equal to or more than the standard number X, it is judged that the timing when the calibration is required has come. However, the sequence number N is an example of a parameter indicating a state of the printer in use. The judgment whether the timing when the calibration is required has come may be made based on another parameter such as a temperature change of the printer (more specifically, a temperature change of the main body casing 2, total number of pages printed in the past, operating time during which the printing operation has sequentially been performed, cumulative total number of pages after the previous calibration, and cumulative total operating time during which the printer has been driven after the previous calibration. Further, in this case, as shown in FIG. 6, an NVRAM 106 may be provided to store therein the total number of pages and/or operating time. According to such a configuration, even though the power supply is broken, the stored information is not eliminated. Additionally, the present invention can be applied to a printer that automatically performs the calibration when it is powered ON.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An image forming device capable of double-side printing to form an image on each of first and second sides of a recording medium, comprising:
    a calibration unit configured to perform calibration for modifying quality of the image to be formed;
    a first judging unit configured to judge, for each page to be printed, whether the calibration is to be performed;
    a second judging unit configured to judge whether a page to be printed is one of a first side in one-side printing and a first side in the double-side printing; and
    a control unit configured to control the calibration unit to perform the calibration when the first judging unit judges that the calibration is to be performed, and the second judging unit judges that the page to be printed is one of the first side in the one-side printing and the first side in the double-side printing.

2. The image forming device according to claim 1, further comprising a count unit configured to count a numerical number of sequentially-printed pages,
wherein the first judging unit judges whether the numerical number of sequentially-printed pages is more than a predetermined value for each page to be printed so as to judge whether the calibration is to be performed.

3. The image forming device according to claim 2, further comprising a third judging unit configured to judge whether there is a subsequent page to be sequentially printed,
wherein the count unit includes a parameter of which an initial value is one, the parameter being incremented each time it is judged by the third judging unit that there is a subsequent page to be sequentially printed.

4. The image forming device according to claim 2, further comprising a third judging unit configured to judge whether a subsequent page is to be sequentially printed,
wherein the count unit counts a numerical number of pages that are judged by the third judging unit to be sequentially printed.

5. A calibrating method used for an image forming device configured to perform double-side printing for forming an image on each of first and second sides of a recording medium and to perform calibration for modifying quality of the image to be formed, the method comprising:
a first step of judging in a processor whether the calibration is to be performed, for each page to be printed;
a second step of judging in said processor whether a page to be printed is one of a first side in one-side printing and a first side in the double-side printing; and
a third step of performing the calibration when it is judged in the first judging step that the calibration is to be performed, and it is judged in the second judging step that the page to be printed is one of the first side in the one-side printing and the first side in the double-side printing.

6. The calibration method according to claim 5, further comprising a fourth step of counting a numerical number of sequentially-printed pages,
wherein, in the first step, it is judged whether the numerical number of sequentially-printed pages is more than a predetermined value for each page to be printed so as to judge whether the calibration is to be performed.

7. The calibration method according to claim 6, further comprising a fifth step of judging whether there is a subsequent page to be sequentially printed,
wherein the fourth step includes a step of counting the numerical number of sequentially-printed pages with a parameter of which an initial value is one, the parameter being incremented each time it is judged in the fifth step that there is a subsequent page to be sequentially printed.

8. The calibration method according to claim 6, further comprising a fifth step of judging whether a subsequent page is to be sequentially printed,
wherein the fourth step includes a step of counting the numerical number of pages that are judged in the fifth step to be sequentially printed.

9. A non-transitory computer readable medium comprising computer readable instructions stored thereon, which cause a computer, which is configured to perform double-side printing for forming an image on each of first and second sides of a recording medium and to perform calibration for modifying quality of the image to be formed, to perform:
a first step of judging whether the calibration is to be performed, for each page to be printed;
a second step of judging whether a page to be printed is one of a first side in one-side printing and a first side in the double-side printing; and
a third step of performing the calibration when it is judged in the first judging step that the calibration is to be performed, and it is judged in the second judging step that the page to be printed is one of the first side in the one-side printing and the first side in the double-side printing.

10. The non-transitory computer readable medium according to claim 9,
wherein the computer readable instructions cause the computer to further perform a fourth step of counting a numerical number of sequentially-printed pages, and
wherein, in the first step, it is judged whether the numerical number of sequentially-printed pages is more than a predetermined value for each page to be printed so as to judge whether the calibration is to be performed.

11. The non-transitory computer readable medium according to claim 10,
wherein the computer readable instructions cause the computer to further perform a fifth step of judging whether there is a subsequent page to be sequentially printed, and
wherein the fourth step includes a step of counting the numerical number of sequentially-printed pages with a parameter of which an initial value is one, the parameter being incremented each time it is judged in the fifth step that there is a subsequent page to be sequentially printed.

12. The non-transitory computer readable medium according to claim 10, further comprising a fifth step of judging whether a subsequent page is to be sequentially printed,
wherein the fourth step includes a step of counting the numerical number of pages that are judged in the fifth step to be sequentially printed.

13. An image forming device capable of double-side printing to form an image on each of first and second sides of a recording medium, comprising:
a calibration unit configured to perform calibration for modifying quality of the image to be formed;
a first judging unit configured to judge, for each page to be printed, whether the calibration is to be performed;
a second judging unit configured to judge whether a page to be printed is a second side in the double-side printing; and
a control unit configured to prevent the calibration unit from performing the calibration when the second judging unit judges that the page to be printed is the second side in the double-side printing, regardless of the judgment of the first judging unit.

* * * * *